(12) United States Patent
Sagayama (10) Patent No.: US 10,246,066 B2
(45) Date of Patent: Apr. 2, 2019

(54) MOTOR MODULE AND ABS HYDRAULIC UNIT

(71) Applicant: Robert Bosch GmbH, Stuttgart (DE)

(72) Inventor: Kosaku Sagayama, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 207 days.

(21) Appl. No.: 15/325,292

(22) PCT Filed: Jun. 23, 2015

(86) PCT No.: PCT/JP2015/068016
§ 371 (c)(1),
(2) Date: Jan. 10, 2017

(87) PCT Pub. No.: WO2016/006435
PCT Pub. Date: Jan. 14, 2016

(65) Prior Publication Data
US 2017/0174195 A1 Jun. 22, 2017

(30) Foreign Application Priority Data
Jul. 10, 2014 (JP) .................................. 2014-142607

(51) Int. Cl.
*B60T 8/40* (2006.01)
*B60T 8/34* (2006.01)
(Continued)

(52) U.S. Cl.
CPC .............. *B60T 8/4022* (2013.01); *B60T 8/34* (2013.01); *B60T 8/368* (2013.01); *B60T 8/4031* (2013.01);
(Continued)

(58) Field of Classification Search
CPC .......... B60Y 2400/73; B60Y 2400/785; B60Y 2410/10; F16H 57/02; F16H 2057/02034; F16H 57/08; F16H 2200/2005
See application file for complete search history.

(56) References Cited

U.S. PATENT DOCUMENTS 4,507,634 A * 3/1985 Vanderlaan ............ H02K 26/00
310/36
5,366,423 A * 11/1994 Mori ......................... F16H 1/28
475/338
(Continued)

FOREIGN PATENT DOCUMENTS

CN       87106666 A    7/1988
DE   102005013059 A1   5/2006
(Continued)

OTHER PUBLICATIONS

International Search Report for Application No. PCT/JP2015/068016 dated Aug. 18, 2015 (English Translation, 2 pages).

*Primary Examiner* — Stacey A Fluhart
(74) *Attorney, Agent, or Firm* — Michael Best & Friedrich LLP (57) ABSTRACT

The invention aims to provide a motor module in which the number of components is reduced and the number of steps required for assembly is reduced, and an ABS hydraulic unit in which the motor module is embedded. Provided is a motor module including a motor and a planetary gear mechanism which is attached to an output shaft of the motor. The motor module includes a fixing portion that integrally fixes the motor and the planetary gear mechanism. The fixing portion fixes the motor by inwardly clamping the motor and fixes an internal gear of the planetary gear mechanism.

16 Claims, 6 Drawing Sheets

(51) Int. Cl.
*F16H 1/28* (2006.01)
*H02K 5/00* (2006.01)
*H02K 7/116* (2006.01)
*B60T 13/14* (2006.01)
*B60T 15/02* (2006.01)
*B60T 15/36* (2006.01)
*B60T 8/36* (2006.01)
*F16H 57/02* (2012.01)

(52) U.S. Cl.
CPC .......... *B60T 8/4054* (2013.01); *B60T 13/142* (2013.01); *B60T 15/028* (2013.01); *B60T 15/36* (2013.01); *F16H 1/28* (2013.01); *H02K 5/00* (2013.01); *H02K 7/116* (2013.01); *B60Y 2400/73* (2013.01); *B60Y 2400/785* (2013.01); *B60Y 2410/10* (2013.01); *F16H 57/02* (2013.01); *F16H 2057/02034* (2013.01); *F16H 2057/02082* (2013.01)

(56) References Cited

U.S. PATENT DOCUMENTS

| | | | | |
|---|---|---|---|---|
| 5,702,321 A | * | 12/1997 | Bakowski | B60K 17/3467 180/249 |
| 5,932,945 A | * | 8/1999 | Volz | B60T 8/4022 310/67 R |
| 6,166,467 A | * | 12/2000 | Tsai | H02K 1/185 310/89 |
| 6,579,073 B1 | | 6/2003 | Burgdorf et al. | |
| 2005/0085324 A1 | * | 4/2005 | Christ | F16H 1/28 475/5 |
| 2009/0289522 A1 | * | 11/2009 | Buban | H02K 1/148 310/216.113 |
| 2015/0240936 A1 | * | 8/2015 | Olbrich | F16B 21/18 475/149 |
| 2015/0375727 A1 | * | 12/2015 | Weh | F16H 25/20 60/594 |
| 2018/0013338 A1 | * | 1/2018 | Gassmann | B60K 1/00 |

FOREIGN PATENT DOCUMENTS

| | | | | |
|---|---|---|---|---|
| DE | 102016205263 B3 | * | 6/2017 | ........... F16H 57/029 |
| EP | 0221665 A1 | | 5/1987 | |
| JP | 2002524336 | | 8/2002 | |
| JP | 2003521645 | | 7/2003 | |
| JP | 2008120113 A | | 5/2008 | |
| JP | 2009171786 A | | 7/2009 | |
| JP | 2011102639 | | 5/2011 | |
| JP | 2012229724 | | 11/2012 | |
| WO | 2014050691 A1 | | 4/2014 | |

* cited by examiner

MOTOR MODULE AND ABS HYDRAULIC UNIT

BACKGROUND OF THE INVENTION

The present invention relates to a motor module which includes a motor and a planetary gear mechanism, and an ABS hydraulic unit in which the motor module is embedded and anti-lock braking control of a hydraulic brake is performed.

In the related art, there is a known motor module including a motor and a reduction gear which is attached to an output shaft of the motor. In such a motor module, the reduction gear having a plurality of gears which are embedded in a housing formed to have a complicated shape is screwed to the motor (for example, refer to JP-A-2012-229724).

SUMMARY OF THE INVENTION

However, in the motor module according to the technology of the related art, there is a need to screw a reduction gear to a motor by using a plurality of screws when attaching the reduction gear to the motor, resulting in an increased number of components and an increased number of steps required for assembly. Thus, significant cost and time are required.

The invention aims to solve the above-described problem in the related art and to provide a motor module in which the number of components is reduced and the number of steps required for assembly is reduced, and an ABS hydraulic unit in which the motor module is embedded.

According to the invention, in a motor module including a motor and a planetary gear mechanism which is attached to an output shaft of the motor, the module includes a fixing portion that integrally fixes the motor and the planetary gear mechanism. The fixing portion fixes the motor by inwardly clamping the motor and fixes an internal gear of the planetary gear mechanism.

In this case, the fixing portion may fix the internal gear thereto by inwardly clamping the internal gear thereto. An end of the fixing portion on the planetary gear mechanism side may be formed so as to be widened in a flange shape in a direction away from a shaft center of the motor. The internal gear may have a flange portion which is formed so as to be widened in a flange shape in the direction away from the shaft center of the motor. An outer diameter of the flange portion may be formed so as to be substantially the same as an outer diameter of the end of the fixing portion on the planetary gear mechanism side. The end of the fixing portion may be in contact with the flange portion of the internal gear. A planetary carrier of the planetary gear mechanism may be provided so as to fix an eccentric shaft driving a pump of an ABS hydraulic unit in which anti-lock braking control of a hydraulic brake is performed.

According to the invention, in an ABS hydraulic unit in which the motor module is embedded and anti-lock braking control of a hydraulic brake is performed, the ABS hydraulic unit includes a block in which a pipeline of a hydraulic circuit connected to the hydraulic brake is formed. An end of a fixing portion on a planetary gear mechanism side is fixed in the motor module so as to fit an inner face of a hole formed in the block.

In this case, an internal gear may be fixed so as to fit the inner face of the hole in the block. The end of the fixing portion may be fixed by being clamped between the internal gear and the block.

According to the invention, it is possible to realize a motor module in which the number of components is reduced and the number of steps required for assembly is reduced, and an ABS hydraulic unit in which the motor module is embedded.

DETAILED DESCRIPTION

Hereinafter, a preferable embodiment according to the invention will be described with reference to the drawings.

Figure 1:
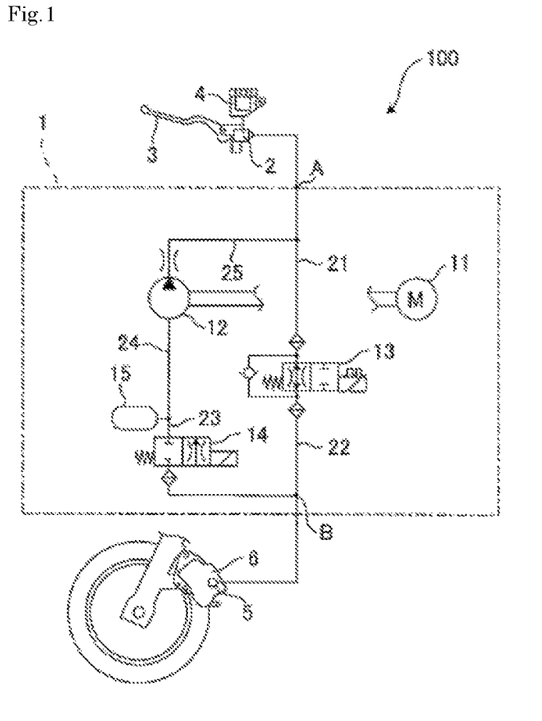
FIG. 1 is a circuit diagram illustrating a hydraulic circuit of an ABS hydraulic unit of the embodiment of the invention.

FIG. 1 is a circuit diagram illustrating a hydraulic circuit of an ABS hydraulic unit of the embodiment of the invention. An automatic two-wheel vehicle according to the embodiment of the invention is equipped with an anti-lock braking system (ABS) only in the front wheel, and an ABS hydraulic unit 100 is provided so as to be able to execute anti-lock braking control only in the front wheel. Hereinafter, a hydraulic circuit 1 of the front wheel will be described.

The hydraulic circuit 1 is filled with brake fluid and is connected to a master cylinder 2 at a connection end A. The master cylinder 2 has a brake lever 3 attached thereto and is connected to a reservoir 4. Accordingly, if a rider manipulates the brake lever 3 in order to control the front wheel brake, the master cylinder 2 discharges the brake fluid accumulated in the reservoir 4 to the hydraulic circuit 1.

Meanwhile, the hydraulic circuit 1 is connected to a wheel cylinder 5 at a connection end B. The wheel cylinder 5 is provided in a brake caliper 6 of the front wheel. As hydraulic pressure inside the wheel cylinder 5 rises, the brake caliper 6 is operated, thereby generating braking force in the front wheel.

The hydraulic circuit 1 in connection between the master cylinder 2 and the wheel cylinder 5 includes a motor 11, a pump 12, an inlet valve 13, an outlet valve 14, and an accumulator 15.

The inlet valve 13 is an electromagnetic valve including a solenoid. The inlet valve 13 is connected to the connection end A through a first pipe 21 and is connected to the connection end B and the outlet valve 14 through a second pipe 22. The second pipe 22 branches off in midstream, thereby being respectively connected to the inlet valve 13, the connection end B, and the outlet valve 14. The inlet valve 13 is connected to the first pipe 21 and the second pipe 22 respectively via filters. The inlet valve 13 has a check valve which is connected in parallel between two filters. The check valve prohibits the brake fluid flowing from the first pipe 21 to the second pipe 22 but allows the brake fluid flowing from the second pipe 22 to the first pipe 21 even though the inlet valve 13 is closed. The brake fluid flowing from the first pipe 21 to the second pipe 22 is controlled by opening and closing the inlet valve 13.

The outlet valve 14 is an electromagnetic valve including a solenoid. The outlet valve 14 is connected to the inlet valve 13 and the connection end B through the second pipe 22 and is connected to the accumulator 15 through a third pipe 23. The outlet valve 14 is connected to the second pipe 22 via a filter. The brake fluid flowing from the second pipe 22 to the third pipe 23 is controlled by opening and closing the outlet valve 14.

The accumulator 15 is connected to the outlet valve 14 through the third pipe 23 and is connected to the pump 12 on an inlet side through a fourth pipe 24. The accumulator 15 can accumulate the brake fluid flowing in through the third pipe 23 and allows the accumulated brake fluid to flow out through the fourth pipe 24.

The pump 12 is connected to the accumulator 15 through the fourth pipe 24, and is connected to the first pipe 21 through a fifth pipe 25. The pump 12 is connected to the fourth pipe 24 and is connected to the fifth pipe 25 via a throttle. The pump 12 operates in accordance with driving of the motor 11 which is a DC motor. The pump 12 takes the brake fluid in from the fourth pipe 24 on the inlet side and discharges the taken brake fluid through the fifth pipe 25 on an outlet side.

Figure 2:
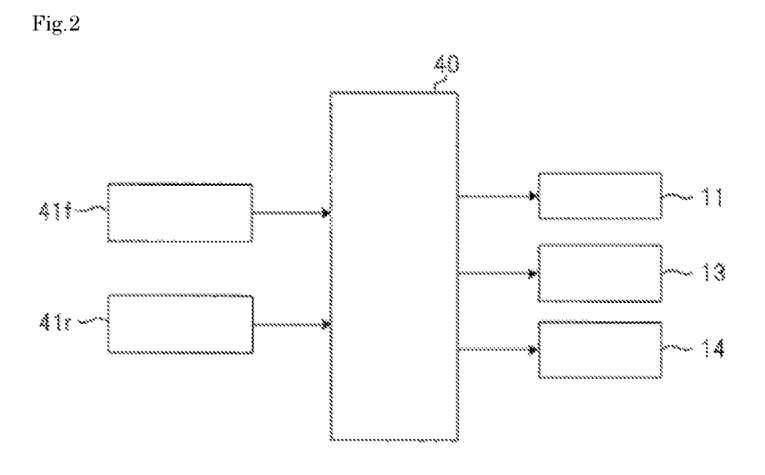
FIG. 2 is a block diagram illustrating a configuration of functions performed by an ECU.

FIG. 2 is a block diagram illustrating a configuration of functions performed by an ECU.

An ECU 40 controls driving of the motor 11 and opening/closing states of the inlet valve 13 and the outlet valve 14 based on a rotational speed signal received from a speed sensor 41f which detects a rotational speed of the front wheel and outputs a corresponding rotational speed signal, and a speed sensor 41r which detects a rotational speed of the rear wheel and outputs a corresponding rotational speed signal.

In a normal braking state, the ECU 40 stops driving of the motor 11, maintains the inlet valve 13 in an open state, and maintains the outlet valve 14 in a closed state. Accordingly, as a rider manipulates the brake lever 3 and a pressure rise of the brake fluid is generated in the master cylinder 2 (refer to FIG. 1), the pressure rise of the brake fluid is transmitted to the wheel cylinder 5 (refer to FIG. 1) through the first pipe 21 (refer to FIG. 1), the inlet valve 13, and the second pipe 22 (refer to FIG. 1). Therefore, the brake caliper 6 (refer to FIG. 1) operates so as to be associated with a manipulation of the brake lever 3 (refer to FIG. 1) performed by a rider, thereby generating braking force in the front wheel.

When performing braking in which braking force is generated by the brake caliper 6, the ECU 40 repeatedly determines whether or not the front wheel is in a locked state based on the rotational speed signal acquired from the speed sensors 41f and 41r, that is, whether or not the front wheel excessively skids on a road surface. When it is determined that the front wheel is in the locked state, the ECU 40 closes the inlet valve 13, opens the outlet valve 14, and operates the pump 12 by driving the motor 11, thereby controlling hydraulic pressure of the brake fluid transmitted to the wheel cylinder 5 so as to be lowered by opening and closing the inlet valve 13 and the outlet valve 14. Accordingly, the ECU 40 performs anti-lock braking control for brake force of the brake caliper 6, thereby cancelling the locked state of the front wheel.

Figure 3:
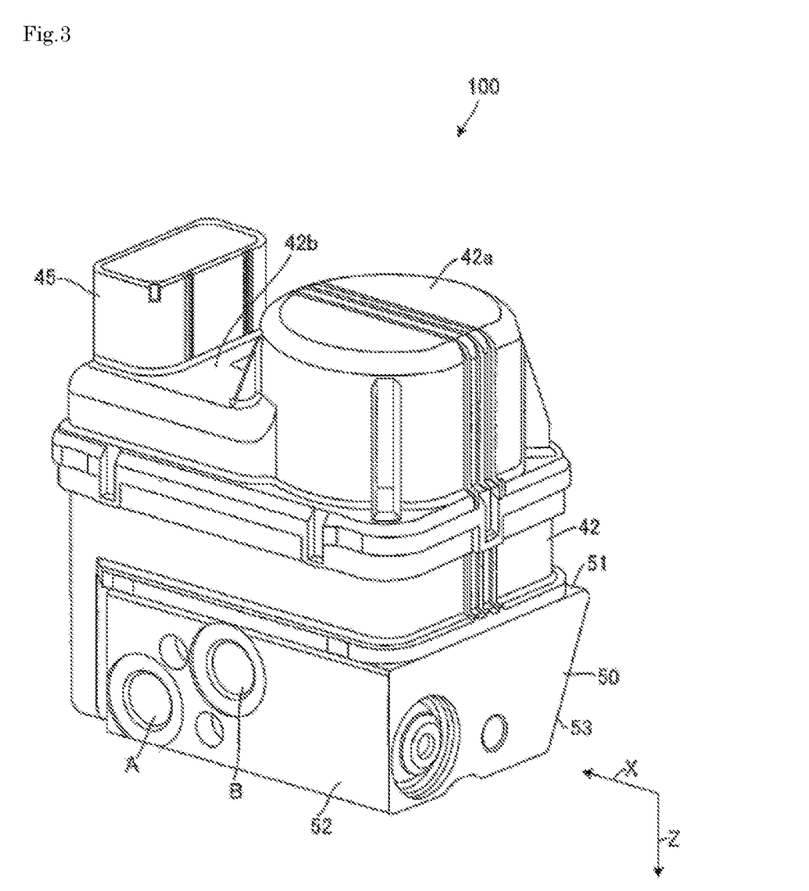
FIG. 3 is a perspective view illustrating the ABS hydraulic unit.
Figure 4:
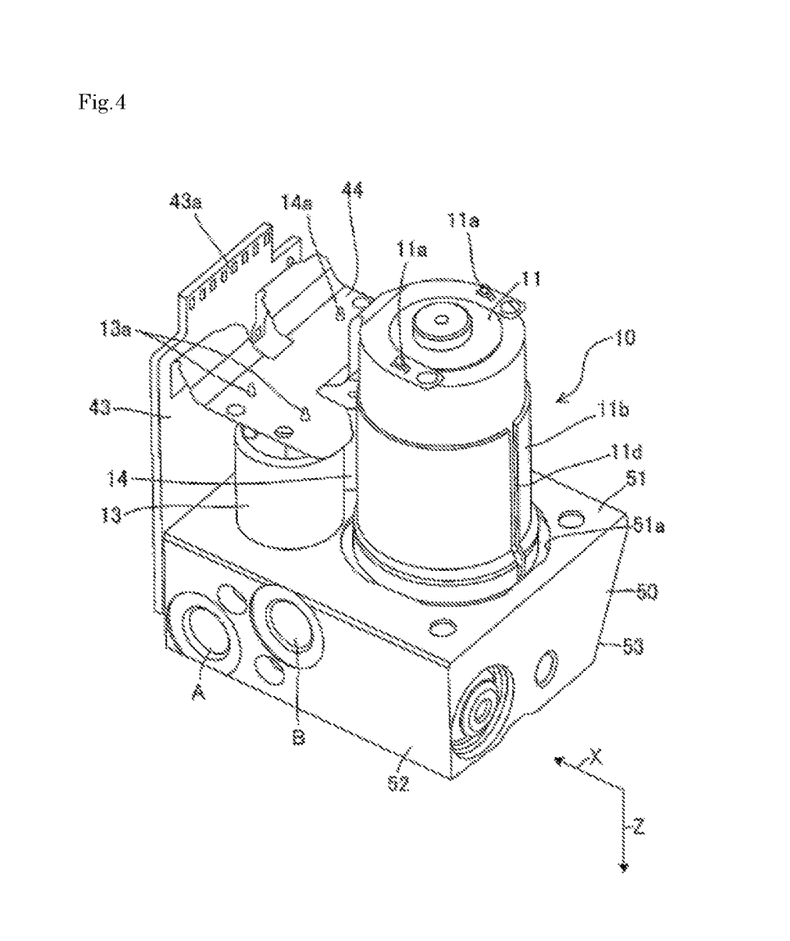
FIG. 4 is a perspective view illustrating a state where a housing is detached from the ABS hydraulic unit.
Figure 5:
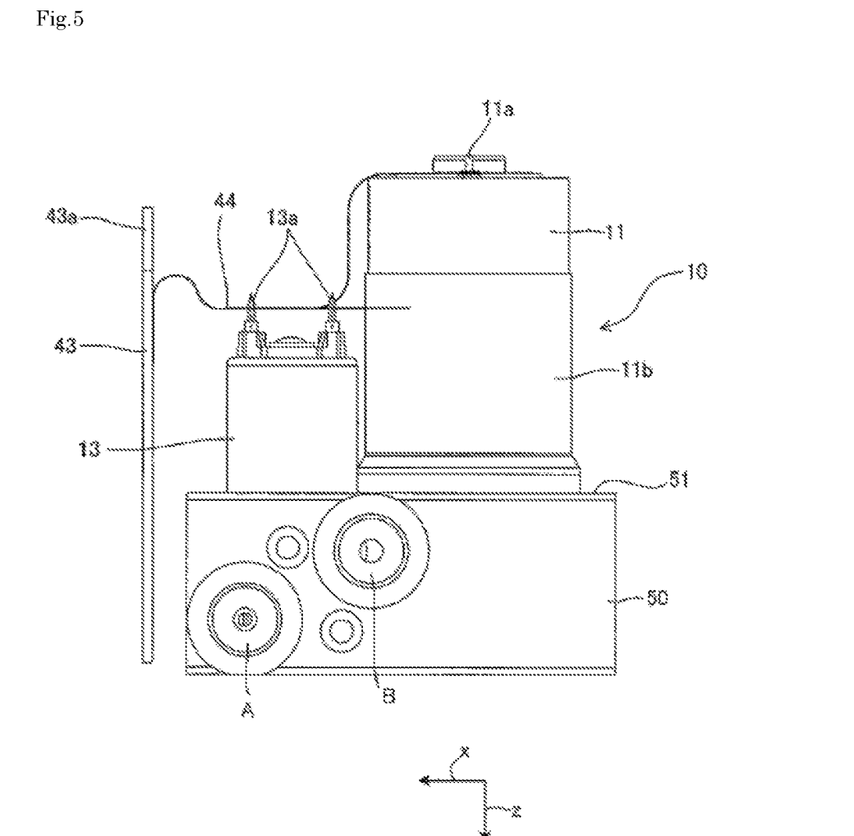
FIG. 5 is a side view of the ABS hydraulic unit from which the housing is detached.
Figure 6:
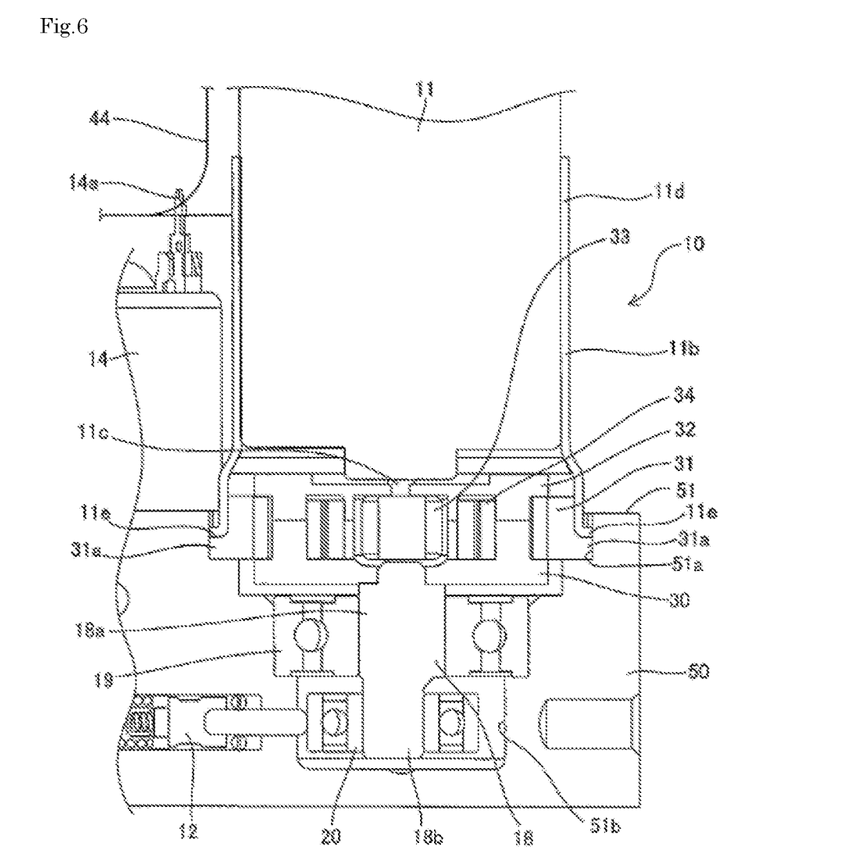
FIG. 6 is a cross-sectional view illustrating the vicinity of a motor module.

FIG. 3 is a perspective view illustrating the ABS hydraulic unit. FIG. 4 is a perspective view illustrating a state where a housing is detached from the ABS hydraulic unit. FIG. 5 is a side view of the ABS hydraulic unit from which the housing is detached. FIG. 6 is a cross-sectional view illustrating the vicinity of a motor module.

As illustrated in FIG. 3, the ABS hydraulic unit 100 is configured to be in a combination of a housing 42 in which the ECU 40 (refer to FIG. 2) is stored and a block 50.

The block 50 is formed of aluminum. In the block 50, the hydraulic circuit 1 (refer to FIG. 1) is included, and pipelines of the first pipe 21 to the fifth pipe 25 through which the brake fluid flows are formed. In the block 50, the connection end A and the connection end B are formed on a piping connection face 52 substantially orthogonal to a housing attachment face 51 to which the housing 42 is attached, and the pump 12 and the accumulator 15 (refer to FIG. 1) are embedded.

The housing 42 is attached onto the housing attachment face 51 of the block 50 and covers a control substrate 43, the motor 11, the inlet valve 13, and the outlet valve 14 (refer to FIG. 4). In the housing 42 while being attached to the block 50, a connector 45 for electrically connecting the control substrate 43 with an external apparatus is provided so as to protrude in a direction away from the block 50. The connector 45 allows a to-be-connected connector (not illustrated) to be installed so as to cover the outer circumference of the connector 45.

In the housing 42, thicknesses of a portion 42a covering the motor 11 (refer to FIG. 6) and the connector 45 in a Z-direction indicated by the arrow Z are formed to be substantially the same thickness, and a portion 42b covering the inlet valve 13 and the outlet valve 14 is formed to be thinner than the portion 42a covering the motor 11 in the Z-direction toward the block 50.

When the housing 42 is detached as illustrated in FIG. 4, the ABS hydraulic unit 100 is provided so as to expose the motor 11, the inlet valve 13, the outlet valve 14, and the control substrate 43. In the housing attachment face 51 of the block 50, a hole is formed in a direction perpendicular to the housing attachment face 51, that is, a Z-direction. The motor 11, the inlet valve 13, and the outlet valve 14 are embedded in the hole. The inlet valve 13 and the outlet valve 14 are arranged between the motor 11 and the control substrate 43. The motor 11, the inlet valve 13, and the outlet valve 14 are embedded substantially perpendicular to the housing attachment face 51 of the block 50.

The control substrate 43 is equipped with a CPU and a memory so as to configure the ECU 40, thereby controlling the ABS hydraulic unit 100. The control substrate 43 has a connector portion 43a which is exposed outwardly in the connector 45 (refer to FIG. 3) when the housing 42 is attached. On account of the connector portion 43a, the control substrate 43 is connected to a connector (not illustrated) on a body side of the automatic two-wheel vehicle equipped with the ABS hydraulic unit 100, thereby being able to transceive various items of information such as wheel speed with the vehicle body.

As illustrated in FIG. 5, the control substrate 43 is arranged so as to extend along the Z-direction in which the motor 11, the inlet valve 13, and the outlet valve 14 (refer to FIG. 4) are embedded in the block 50. In other words, an in-plane direction of the control substrate 43 and the Z-direction in which the motor 11, the inlet valve 13, and the outlet valve 14 are embedded in the block 50 are substantially parallel to each other.

The control substrate 43 is electrically connected to the motor 11, the inlet valve 13, and the outlet valve 14 via the film-like flexible wiring 44 having flexibility. Accordingly, the control substrate 43 can control opening and closing of the inlet valve 13 and the outlet valve 14 by energizing or de-energizing the inlet valve 13 and the outlet valve 14, and can control rotations of the motor 11.

An end of the flexible wiring 44 is fixed to the control substrate 43, thereby being electrically connected thereto. Each of the motor 11, the inlet valve 13, and the outlet valve 14 are electrically connected to the flexible wiring 44 as connection terminals 11a, 13a, and 14a are stuck and hooked to the flexible wiring 44.

As illustrated in FIG. 6, the motor 11 is embedded in a hole 51a formed in the housing attachment face 51 of the block 50 via a motor mount 11b (a fixing portion) which is attached to the motor 11 along its outer circumference. In the hole 51a, a planetary gear mechanism 30 and an eccentric shaft 18 are embedded. Driving force of the motor 11 is caused to drive the eccentric shaft 18 after being decelerated by the planetary gear mechanism 30.

The planetary gear mechanism 30 is in connection between the motor 11 and the eccentric shaft 18, and includes an internal gear 31, a planetary carrier 32, a sun gear 33, and a planetary gear 34.

A wheel lock is formed in the internal gear 31 so as to prohibit the internal gear 31 from turning by being fixed to the block 50 in the hole 51a. The internal gear 31 is formed to have a ring shape, and a plurality of teeth arrayed along the inner circumferential face are formed therein.

The planetary carrier 32 is formed to have a disk shape and is arranged in the internal gear 31. In the planetary carrier 32, three planetary gears 34 are rotatably attached. The planetary gear 34 is engaged with teeth formed along the inner circumferential face of the internal gear 31 at all times.

In the planetary carrier 32, the sun gear 33 is arranged in the middle of the three planetary gears 34. The sun gear 33 is engaged with the three planetary gears 34 at all times while being embedded in the planetary carrier 32.

A hole is formed in the planetary carrier 32 in the vicinity of a shaft center, and the sun gear 33 is installed in an output shaft 11c of the motor 11 penetrating the hole so as to extend into the planetary carrier 32. The sun gear 33 is attached to the output shaft 11c by being fixed thereto so as not to rotate. The sun gear 33 and the output shaft 11c integrally rotate.

A hole is formed in the planetary carrier 32 in the vicinity of the shaft center on the eccentric shaft 18 side, and the eccentric shaft 18 is installed and fixed to the hole. Accordingly, the eccentric shaft 18 installed in the hole rotates integrally with the planetary carrier 32.

An end of the eccentric shaft 18 is supported by the planetary gear mechanism 30, and a rotary shaft portion 18a rotating coaxially with the motor 11 is supported by the block 50 via a bearing 19. In the other end of the eccentric shaft 18, a ball bearing 20 is attached to the periphery of an eccentric portion 18b which is a shaft that is eccentric with respect to the rotary shaft of the motor 11, thereby smoothly transmitting piston motion to the pump 12. As the eccentric shaft 18 rotates and transmits piston motion to the pump 12, the pump 12 causes a piston to perform reciprocating movements, thereby discharging the brake fluid to the fifth pipe 25 (refer to FIG. 1) of the hydraulic circuit 1.

In the planetary gear mechanism 30, according to the above-described configuration, as the sun gear 33 installed in the output shaft 11c rotates by the driving force of the motor 11, each of the three planetary gears 34 engaged with the sun gear 33 rotates in a direction opposite to that of the sun gear 33. Since each of the three planetary gears 34 is engaged with the internal gear 31, the three planetary gears 34 move along the inner circumferential face of the internal gear 31 by rotating. In this case, the three planetary gears 34 rotationally move in the internal gear 31 in the same direction as the direction in which the sun gear 33 rotates.

Since the three planetary gears 34 are embedded in the planetary carrier 32, the planetary carrier 32 rotationally moves in the internal gear 31 integrally with the three planetary gears 34. Accordingly, the eccentric shaft 18 rotating integrally with the planetary carrier 32 rotates in the same direction as that of the sun gear 33. The planetary gear mechanism 30 according to the embodiment of the invention has a speed reduction ratio in which a rotational frequency of the output shaft 11c of the motor 11 decreased to approximately ⅕ thereof is output from the eccentric shaft 18, and torque of the output shaft 11c of the motor 11 increased by five times is output from the eccentric shaft 18. In other words, for example, when the motor 11 rotates at 15,000 rpm (revolutions per minute), the output shaft 11c rotates at 3,000 rpm, and when the motor 11 rotates at 20,000 rpm, the output shaft 11c rotates at 4,000 rpm. Moreover, torque of 10 Ncm in the output shaft 11c of the motor 11 becomes 50 Ncm in the eccentric shaft 18.

As illustrated in FIG. 6, the motor 11 and the planetary gear mechanism 30 according to the embodiment of the invention are fixed integrally with each other via the motor mount 11b, and the motor 11, the motor mount 11b, and the planetary gear mechanism 30 are integrally provided as a motor module 10. The motor mount 11b is formed of metal such as iron, thereby preventing magnetic force from escaping from the inside of the motor 11.

The motor mount 11b is formed to have a cylindrical shape in which an end thereof on the planetary gear mechanism 30 side expands and the diameter is coaxially enlarged. A cut 11d which continues from the end on the planetary gear mechanism 30 side to the end on the motor 11 side is formed at a portion thereof. The motor mount 11b is formed to have a diameter slightly smaller than the outer diameter of the motor 11. The motor mount 11b is warped so as to be widened and is installed in the motor 11, thereby being provided so as to fix the motor 11 by inwardly clamping the motor 11.

The motor mount 11b is provided so as to fix the internal gear 31 of the planetary gear mechanism 30 by inwardly clamping the internal gear 31. In this case, the motor mount 11b may be caulked in order to be fixed to the internal gear 31 more firmly. The motor mount 11b is formed so as to be widened in a flange shape by bending the end 11e on a planetary gear mechanism 31 side in a direction away from the shaft center of the rotary shaft of the motor 11.

In the internal gear 31 of the planetary gear mechanism 30, a flange portion 31a widened in a flange shape in the direction away from the shaft center of the rotary shaft of the motor 11 is formed, and the end 11e of the motor mount 11b is in contact with the flange portion 31a of the internal gear 31. The outer diameter of the flange portion 31a is formed to have substantially the same diameter as the outer diameter of the end 11e of the motor mount 11b.

The end 11e of the motor mount 11b on the planetary gear mechanism 30 side, and the internal gear 31 are fixed in the motor module 10 so as to fit an inner face of the hole 51a formed in the block 50. In this case, the end 11e of the motor mount 11b is fixed so as to be in close contact with the internal gear 31 and the block 50 by being clamped between the internal gear 31 and the block 50.

In the embodiment of the invention, the motor module 10 includes the motor 11, the planetary gear mechanism 30 attached to the output shaft 11c of the motor 11, and the motor mount 11b integrally fixing the motor 11 and the planetary gear mechanism 30. The motor mount 11b is provided so as to fix the motor 11 by inwardly clamping the motor 11 and to fix the internal gear 31 of the planetary gear mechanism 30. Accordingly, in the motor module 10, the motor 11 and the planetary gear mechanism 30 are integrally fixed in a state of being coaxially positioned by only putting the motor 11 and the planetary gear mechanism 30 into the motor mount 11b. Accordingly, in the motor module 10, the number of components can be reduced since no screw is used, and the number of steps required for assembly can be reduced since there is no need for a step of screwing screws. Moreover, since the motor 11 and the planetary gear mechanism 30 are coaxially positioned with high precision, it is possible to improve the vibration characteristics at the time of driving the motor module 10.

In the embodiment of the invention, the flange portion 31a is formed in the internal gear 31 of the planetary gear mechanism 30. Accordingly, when the planetary gear mechanism 30 is put into the motor mount 11b, the end 11e of the motor mount 11b butts against the flange portion 31a of the internal gear 31. Therefore, in the motor module 10, positioning of the motor mount 11b and the planetary gear mechanism 30 in a put-in direction is performed by only putting the planetary gear mechanism 30 into the motor mount 11b.

In the embodiment of the invention, the end 11e of the motor mount 11b is formed so as to be widened in a flange shape, and the flange portion 31a is formed in the internal gear 31 of the planetary gear mechanism 30. Accordingly, in the motor module 10, the end 11e of the motor mount 11b and the flange portion 31a of the internal gear 31 fit the hole 51a formed in the block 50, thereby being able to be fixed thereto. Therefore, when assembling the ABS hydraulic unit 100, the motor module 10 can be fixed to the block 50 by only being put into the hole 51a formed in the block 50.

Hereinbefore, the invention has been described based on the embodiment. However, the invention is not limited thereto. For example, in the embodiment, the ABS hydraulic unit 100 is provided so as to be able to execute ABS control only in the front wheel. However, the embodiment is not limited thereto. For example, the ABS hydraulic unit 100 may be provided so as to be able to execute ABS control only in the rear wheel by being connected to a master cylinder of a brake pedal and a wheel cylinder of the rear wheel.

In the above-described embodiment, the cylindrically shaped motor mount 11b is used. However, the embodiment is not limited thereto. The motor mount may have a different shape as long as the motor can be fixed by being inwardly clamped.

In the above-described embodiment, the motor mount 11b fixes the internal gear 31 by inwardly clamping the internal gear 31. However, the embodiment is not limited thereto. The motor mount may fix the internal gear by using a different fixing method as long as the internal gear can be fixed.

In the above-described embodiment, in the motor module 10, the end 11e of the motor mount 11b and the flange portion 31a of the internal gear 31 fit the hole 51a formed in the block 50, thereby being fixed thereto. However, the embodiment is not limited thereto. Any one of the motor mount and the internal gear may fit the hole formed in the block as long as the motor module can be fixed to the block.

REFERENCE SIGNS LIST

1 HYDRAULIC CIRCUIT
2 MASTER CYLINDER
3 BRAKE LEVER
4 RESERVOIR
5 WHEEL CYLINDER
6 BRAKE CALIPER (HYDRAULIC BRAKE)
10 MOTOR MODULE
11 MOTOR
11a CONNECTION TERMINAL
11b MOTOR MOUNT (FIXING PORTION)
11c OUTPUT SHAFT
11d CUT
11e END
12 PUMP
13 INLET VALVE
13a CONNECTION TERMINAL
14 OUTLET VALVE
14a CONNECTION TERMINAL
15 ACCUMULATOR
18 ECCENTRIC SHAFT
18a ROTARY SHAFT PORTION
18b ECCENTRIC PORTION
19 BEARING
20 BALL BEARING
21 FIRST PIPE
22 SECOND PIPE
23 THIRD PIPE
24 FOURTH PIPE
25 FIFTH PIPE
30 PLANETARY GEAR MECHANISM
31 INTERNAL GEAR
31a FLANGE PORTION
32 PLANETARY CARRIER
33 SUN GEAR
34 PLANETARY GEAR
40 ECU
41f SPEED SENSOR
41r SPEED SENSOR
42 HOUSING
42a PORTION COVERING PUMP
42b PORTION COVERING VALVE
43 CONTROL SUBSTRATE
43a CONNECTOR PORTION
44 FLEXIBLE WIRING
45 CONNECTOR
50 BLOCK
51 HOUSING ATTACHMENT FACE
51a HOLE
51b SPACE
52 PIPING CONNECTION FACE
100 ABS HYDRAULIC UNIT

The invention claimed is:

1. A motor module comprising:
a motor and a planetary gear mechanism which is attached to an output shaft of the motor, and
a fixing portion that integrally fixes the motor and the planetary gear mechanism to each other,
wherein the fixing portion fixes the motor by inwardly clamping the motor and fixes an internal gear of the planetary gear mechanism, wherein the fixing portion fixes the internal gear thereto by inwardly clamping the internal gear thereto.

2. The motor module according to claim 1,
wherein the internal gear has a flange portion which is formed so as to be widened in a flange shape in a direction away from the shaft center of the motor.

3. The motor module according to claim 2,
wherein an outer diameter of the flange portion is formed so as to be substantially the same as an outer diameter of an end of the fixing portion on a planetary gear mechanism side.

4. The motor module according to claim 2,
wherein an end of the fixing portion is in contact with the flange portion of the internal gear.

5. The motor module according to claim 1,
wherein a planetary carrier of the planetary gear mechanism is configured to fix an eccentric shaft driving a pump of an ABS hydraulic unit in which anti-lock braking control of a hydraulic brake is performed.

6. An ABS hydraulic unit in which the motor module according to claim 1 is embedded and anti-lock braking control of a hydraulic brake is performed, the unit comprising:
a block in which a pipeline of a hydraulic circuit connected to the hydraulic brake is formed,
wherein an end of the fixing portion on a planetary gear mechanism side is fixed in the motor module so as to fit an inner face of a hole formed in the block.

7. The ABS hydraulic unit according to claim 6,
wherein an internal gear is fixed so as to fit the inner face of the hole in the block.

8. The ABS hydraulic unit according to claim 6,
wherein the end of the fixing portion is fixed by being clamped between the internal gear and the block.

9. A motor module comprising:
a motor and a planetary gear mechanism which is attached to an output shaft of the motor, and
a fixing portion that integrally fixes the motor and the planetary gear mechanism to each other,
wherein the fixing portion fixes the motor by inwardly clamping the motor and fixes an internal gear of the planetary gear mechanism, wherein an end of the fixing portion on a planetary gear mechanism side is formed so as to be widened in a flange shape in a direction away from a shaft center of the motor.

10. The motor module according to claim 9,
wherein the internal gear has a flange portion which is formed so as to be widened in a flange shape in a direction away from the shaft center of the motor.

11. The motor module according to claim 10,
wherein an outer diameter of the flange portion is formed so as to be substantially the same as an outer diameter of an end of the fixing portion on a planetary gear mechanism side.

12. The motor module according to claim 10,
wherein an end of the fixing portion is in contact with the flange portion of the internal gear.

13. The motor module according to claim 9,
wherein a planetary carrier of the planetary gear mechanism is configured to fix an eccentric shaft driving a pump of an ABS hydraulic unit in which anti-lock braking control of a hydraulic brake is performed.

14. An ABS hydraulic unit in which the motor module according to claim 9 is embedded and anti-lock braking control of a hydraulic brake is performed, the unit comprising:
a block in which a pipeline of a hydraulic circuit connected to the hydraulic brake is formed,
wherein an end of the fixing portion on a planetary gear mechanism side is fixed in the motor module so as to fit an inner face of a hole formed in the block.

15. The ABS hydraulic unit according to claim 14,
wherein an internal gear is fixed so as to fit the inner face of the hole in the block.

16. The ABS hydraulic unit according to claim 14,
wherein the end of the fixing portion is fixed by being clamped between the internal gear and the block.

\* \* \* \* \*